US010670501B2

(12) United States Patent
Jelokhani Niaraki et al.

(10) Patent No.: US 10,670,501 B2
(45) Date of Patent: Jun. 2, 2020

(54) APPARATUS FOR UNIVERSAL TESTING OF METAL SHEET FORMABILITY

(71) Applicants: Rasoul Jelokhani Niaraki, Qazvin (IR); Ali Fazli, Qazvin (IR); Abolfazl Ghoorchibeygi, Qazvin (IR); Seyed Ahmad Hosseini, Qazvin (IR)

(72) Inventors: Rasoul Jelokhani Niaraki, Qazvin (IR); Ali Fazli, Qazvin (IR); Abolfazl Ghoorchibeygi, Qazvin (IR); Seyed Ahmad Hosseini, Qazvin (IR)

(*) Notice: Subject to any disclaimer, the term of this patent is extended or adjusted under 35 U.S.C. 154(b) by 284 days.

(21) Appl. No.: 15/688,462

(22) Filed: Aug. 28, 2017

(65) Prior Publication Data
US 2018/0067028 A1 Mar. 8, 2018

(51) Int. Cl.
*G01N 3/28* (2006.01)
*G01N 3/12* (2006.01)

(52) U.S. Cl.
CPC .......... *G01N 3/28* (2013.01); *G01N 3/12* (2013.01); *G01N 2203/0003* (2013.01); *G01N 2203/0048* (2013.01); *G01N 2203/0282* (2013.01)

(58) Field of Classification Search
CPC ..................................... G01N 3/28; G01B 3/12
See application file for complete search history.

(56) References Cited

U.S. PATENT DOCUMENTS

| 974,269 A * | 11/1910 | Hildreth | G01N 3/28 73/87 |
| 2,875,608 A | 3/1959 | Engelhardt | |
| 5,507,189 A * | 4/1996 | Kim | G01N 3/28 73/838 |
| 5,626,048 A * | 5/1997 | McClung | B21D 22/22 72/336 |
| 2007/0220966 A1 | 9/2007 | Petrinic | |
| 2009/0249856 A1 * | 10/2009 | Smyers | B21D 22/22 72/453.07 |
| 2011/0314906 A1 * | 12/2011 | Shuaib | B21D 22/20 73/159 |
| 2014/0190276 A1 | 7/2014 | Hung et al. | |
| 2015/0283599 A1 * | 10/2015 | Murata | B21J 5/025 72/352 |

* cited by examiner

*Primary Examiner* — Clayton E. LaBalle
*Assistant Examiner* — Dennis Hancock
(74) *Attorney, Agent, or Firm* — NovoTechIP International PLLC (57) ABSTRACT

A system for universal testing of metal sheet formability is described. The system discloses a cylinder barrel including two pistons for testing formability of the metal sheets. The driving force is provided by the hydraulic pressure of an incompressible fluid. The present application also describes an apparatus to perform various formability tests on metal sheets such as the bulge test, Nakazima test, Marciniak test, cupping test, and the blanking test. The system can also be used in hydroforming metal sheets.

11 Claims, 9 Drawing Sheets

APPARATUS FOR UNIVERSAL TESTING OF METAL SHEET FORMABILITY

CROSS-REFERENCE TO RELATED APPLICATION

This application claims the benefit of priority to Iran patent application serial number 139550140003006774 filed on Aug. 26, 2016, which is incorporated by reference herein in its entirety.

TECHNICAL FIELD

The present disclosure relates generally to a method and apparatus for testing physical properties of a metal plate. More specifically, the present application relates to a method and apparatus for testing formability of a metal plate.

BACKGROUND

Formability is the ability of a given metal blank to undergo plastic deformation without being damaged. The plastic deformation capacity of metallic materials, however, is limited to a certain extent, at which point, the material could experience tearing or fracture (breakage). One main failure mode is caused by tearing of the material. This is typical for sheet-forming applications. A neck may appear at a certain forming stage. This is an indication of localized plastic deformation. Whereas homogeneous deformation generally takes place in and around the subsequent neck location in the early stable deformation stage, almost all deformation is concentrated in the neck zone during the quasi-stable and instable deformation phase. This leads to material failure manifested by tearing.

From the metallurgical perspective, the formability of a particular metal depends on the metal's elongation, which is the total amount of strain measured during tensile testing. A metal with a large elongation has good formability because the metal is able to undergo a large amount of strain (work) hardening. Strain hardening results in an increase of the load-carrying capacity of a metal as it deforms. It also prevents strains from being localized during forming, so the deformation is uniformly distributed throughout a particular section of the material that is exposed to a specific set of forming stresses. Thus, each localized region of the metal thins uniformly during the forming process.

The load carrying capacity of the metal as it deforms is opposed by the reduction in cross-sectional area of the metal as it thins. There is a maximum load where the increase in stress due to the decrease in the metal cross-sectional area becomes greater than the increase in the load-carrying ability of the metal due to strain hardening. Necking begins at this point as the metal starts to thin more in a localized region. Any additional deformation is generally concentrated in the necking area, while the loads in the surrounding areas decrease.

Determining the mechanical properties is one of the key issues in analyzing the deformation behavior of the sheet metal materials. The uniaxial tensile test is most commonly used to determine the flow curve of the materials. However the maximum achievable strain in this test is limited. Furthermore, in an actual deformation process, the state of stress is mostly multiaxial rather than uniaxial. Thus, a simple uniaxial tensile test is of limited use when evaluating the formability of sheet metals. Therefore, a biaxial test, such as bulge test, can predict the metal behavior more close to the reality. Furthermore, the other tests such as Nakazima and Marciniak tests can be used to determine forming limit diagram (FLD) and predict the defect of tearing during the forming process.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one aspect, the present disclosure is directed to an apparatus for universal tests of metal sheets formability. The apparatus includes: a cylinder barrel, a first piston disposed in a lower portion of the cylinder barrel, a lower chamber port located along a bottom of the hydraulic cylinder, below the first piston, and a middle chamber port formed in a central portion of the cylinder barrel, above the first piston. The apparatus also includes, a second piston located within the cylinder barrel, above the first piston, a blankholder disposed above the second piston, the blankholder configured to hold a blank, and a punch connected to the rod of the first piston and configured to press the blank against a die, where the die is disposed above the blank, the apparatus also includes a bulge chamber, as well as a bulge chamber inlet disposed below the blank on a first side of the blankholder and a bulge chamber outlet disposed below the blank on a second side of the blankholder.

The above general aspect may include one or more of the following features. In one example, a first directional control valve configured to control fluid inflow and outflow in the cylinder barrel, a safety valve configured to control fluid inflow and outflow in the middle chamber of the cylinder barrel The apparatus can also include a second directional control valve configured to control fluid flow to the cylinder barrel or to the bulge chamber, as well as a first check valve, the first check valve configured to at least partially control fluid flow inside a space extending between the punch and the blank, and a pilot operated check valve, the pilot operated check valve configured to at least partially control the fluid flow outside the space extending between the punch and the blank. In some cases, the apparatus includes a pressure sensor connected to the bulge chamber, the pressure sensor configured to measure fluid pressure inside the space extending between the blank and the blankholder, and a displacement measurement device disposed on top of the blank configured to record the displacement of the blank during a forming process. In another example, the apparatus includes a third valve configured to at least partially control fluid inside a central chamber and upper chamber of the cylinder barrel. In some implementations, the apparatus includes a first spring, where a first end of the first spring is connected to the bottom portion of the cylinder barrel via a first pin, and a second end of the first spring is connected to the first piston via s second pin. In such cases, the first spring may be configured to move the second pin and the first piston in a downward direction when the at least one directional control valve transitions from a closed state to an open state. The apparatus may further include a snap ring, the snap ring configured to contact a second piston and move the second piston downward in order to detach the blank from the die. In some other implementations, the apparatus is used for hydroforming metal sheets, Forming Limit Curve testing, or Blanking testing. As another example, the piston may be configured to move axially in the cylinder barrel in a direction towards the die. In one implementation, fluid input and fluid output is controlled manually. In some cases, the fluid includes water or an oil. In addition, in one implementation the displacement measurement device is a high-resolution camera or a displacement measurement sensor. The apparatus may also further include a heating device configured to adjust the temperature of the blank.

In another aspect, the present disclosure is directed to an apparatus for testing metal sheets formability. The apparatus includes a cylinder barrel, a first piston disposed in a lower portion of the cylinder barrel, a lower chamber port disposed along a bottom portion of the cylinder barrel, below the first piston, a millde chamber port formed in a central portion of the cylinder barrel, above the first piston, a first safety valve configured to control fluid inflow and outflow in the cylinder barrel, a second piston located within the cylinder barrel, above the first piston, a blankholder and a blank, the blankholder configured to receive the blank, a punch connected to a rod of the first piston and configured to press the blank against a die, the die being disposed above the blank, a first directional control valve configured to permit fluid to enters a middle chamber portion of the cylinder barrel and return the first piston to its initial position, a second directional control valve configured to remove pressure from along a lower surface of the second piston, and/or a first spring and a second spring, the first spring and the second spring configured to move the second piston in an axial direction in order to adjust the distance between the blank and the die.

In another aspect, the present disclosure is directed to a method of testing of metal sheet formability using a formability system. The method includes positioning a blank above a blankholder, filling a lower portion of a cylinder barrel with a fluid through a lower chamber port such that a first piston and a second piston move in an axial direction until the blank is secured between the blankholder and a die, substantially filling a bulge chamber with a fluid, the bulge chamber comprising a space extending between a punch and the blank, removing air from the bulge chamber, moving the punch gradually in an axial direction toward the blank through the application of fluid pressure via the first piston, and recording images of blank displacement using a displacement measurement device.

The above general aspect may include one or more of the following features. In one example, the method also includes distancing the blank from both the die and the punch by movement of both the first piston and the second piston downward using fluid power. As another example, the method may include moving the first piston axially back by use of a spring, and distancing the blank and the blankholder from the die when a snap ring on a rod of the first piston touches the second piston. In some cases, the method includes distancing the blank from the punch by moving the first piston axially using fluid power, distancing the blank from the die by moving the second piston axially back via at least one spring, where the at least one spring is disposed outside the cylinder barrel and is connected at a first end to a base and at a second end to the blankholder. In some implementations, the displacement measurement device is a high-resolution camera or a displacement measurement sensor. In another example, the methods can be to produce a Forming Limit Curve, and/or is used for Blanking testing, Nakazima testing, Marciniak testing, Bulge testing, and/or Cupping testing. In one implementation, the method is used for hydroforming metal sheets Other systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the following claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, various examples are presented to provide a thorough understanding of inventive concepts, and various aspects thereof that are set forth by this disclosure. However, upon reading the present disclosure, it may become apparent to persons of skill that various inventive concepts and aspects thereof may be practiced without one or more details shown in the examples. In other instances, well known procedures, operations and materials have been described at a relatively high-level, without detail, to avoid unnecessarily obscuring description of inventive concepts and aspects thereof.

Formability is a term applicable to sheet metal forming. Sheet metal operations such as deep drawing, cup drawing, bending etc. involve extensive tensile deformation. Therefore, the problems of localized deformation such as necking and fracture due to thinning down are common in many sheet forming operations. For purposes of this application, formability may be understood as the ability of a sheet metal to be formed into a desired shape without undergoing localized necking, thinning, or fracture. When a sheet metal is subjected to plane strain deformation, the critical strain refers to the strain load or level at which localized necking or plastic instability occurs. Determining the mechanical properties is one of the key issues in analyzing the deformation behavior of the sheet metal materials. The uniaxial tensile test is most commonly used to determine the flow curve of the materials. However the maximum achievable strain in this test is limited. Furthermore, in an actual deformation process, the state of stress is mostly multiaxial rather than uniaxial. Thus, a simple uniaxial tensile test is of limited use when evaluating the formability of sheet metals. Therefore, a biaxial test, such as bulge test, can predict the metal behavior more close to the reality. Furthermore, the other tests such as Nakazima and Marciniak tests can be used to determine forming limit diagram (FLD) and predict the defect of tearing during the forming process.

In one general aspect, the instant application describes a system for universal testing of metal sheet formability. The system disclosed herein includes a hydraulic cylinder comprising two pistons for testing formability of the metal sheets. In one implementation, the driving force is provided by the hydraulic pressure of an incompressible fluid. The present application also describes an apparatus to perform various formability tests on metal sheets such as the bulge test, Nakazima test, Marciniak test, cupping test, and other such tests. The present application also can be used as a blanking and hydroforming apparatus.

Figure 1A:
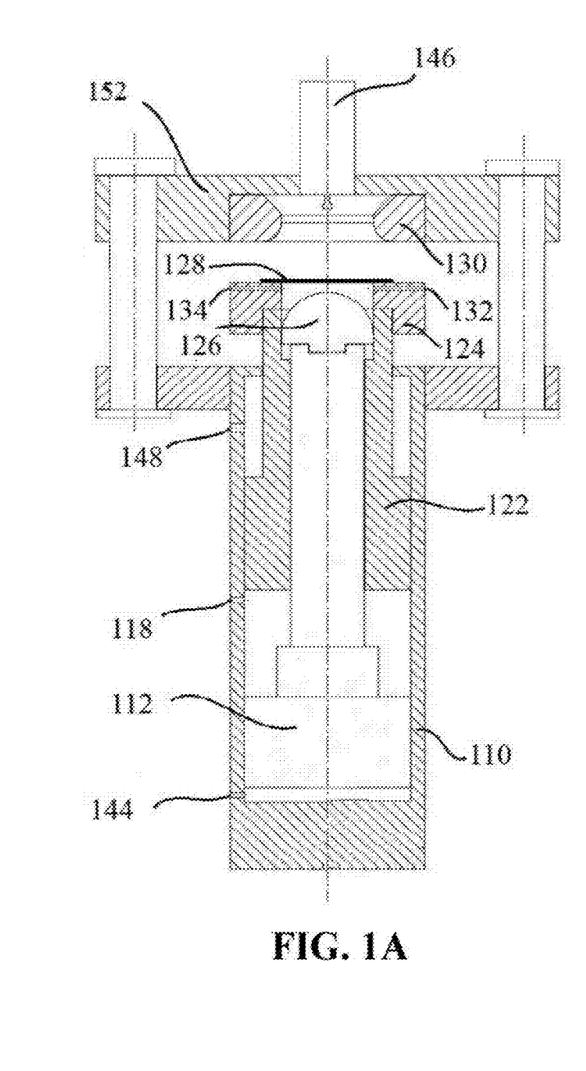
FIGS. 1A and 1B illustrate an implementation of a universal testing of metal sheet formability system.
Figure 1B:
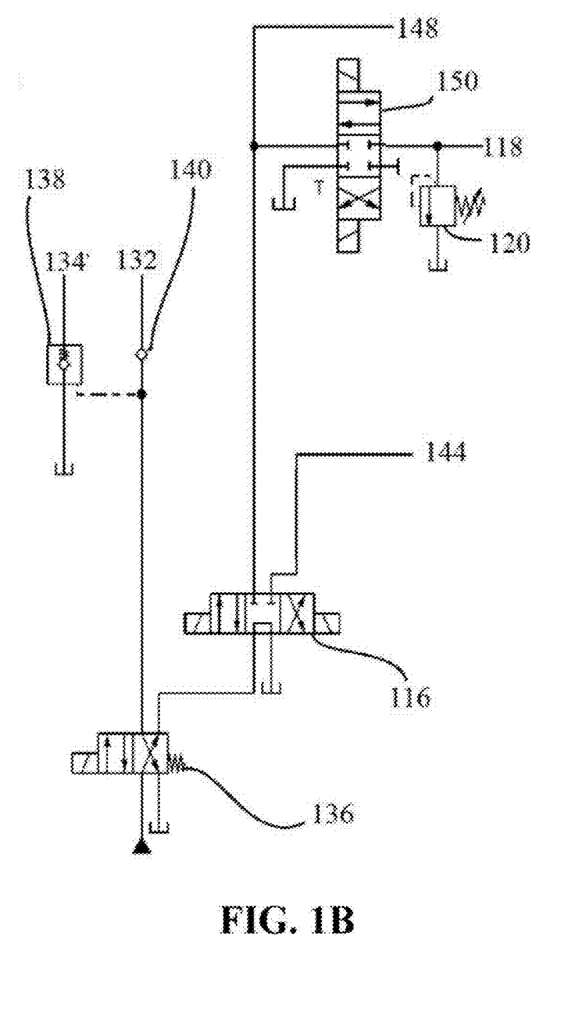

FIGS. 1A & 1B illustrate an implementation of the universal testing of metal sheet formability system ("system") 100. Specifically, FIG. 1A depicts the mechanical section of the system 100 and FIG. 1B illustrates an implementation of a schematic hydraulic circuit that can control fluid inlet and outlet in the system. Referring to FIG. 1A, in some implementations, the system 100 may include a cylinder barrel 110, a first piston 112, a lower chamber port 144, a middle chamber port 118, an upper chamber port 148, a second piston 122, a blankholder 124, a punch 126, a die 130, a bulge chamber inlet 132, a bulge chamber outlet 134, a pressure sensor (not shown) and a displacement measurement device 146. Additional components are presented schematically in FIG. 1B, and include a first directional control valve 116, a safety valve 120, a second directional control valve 136, a third directional control valve 150, a pilot operated check valve 138, a check valve 140. In different implementations, the system 100 is configured to test formability of a sheet, such as a blank 128.

Figure 2A:
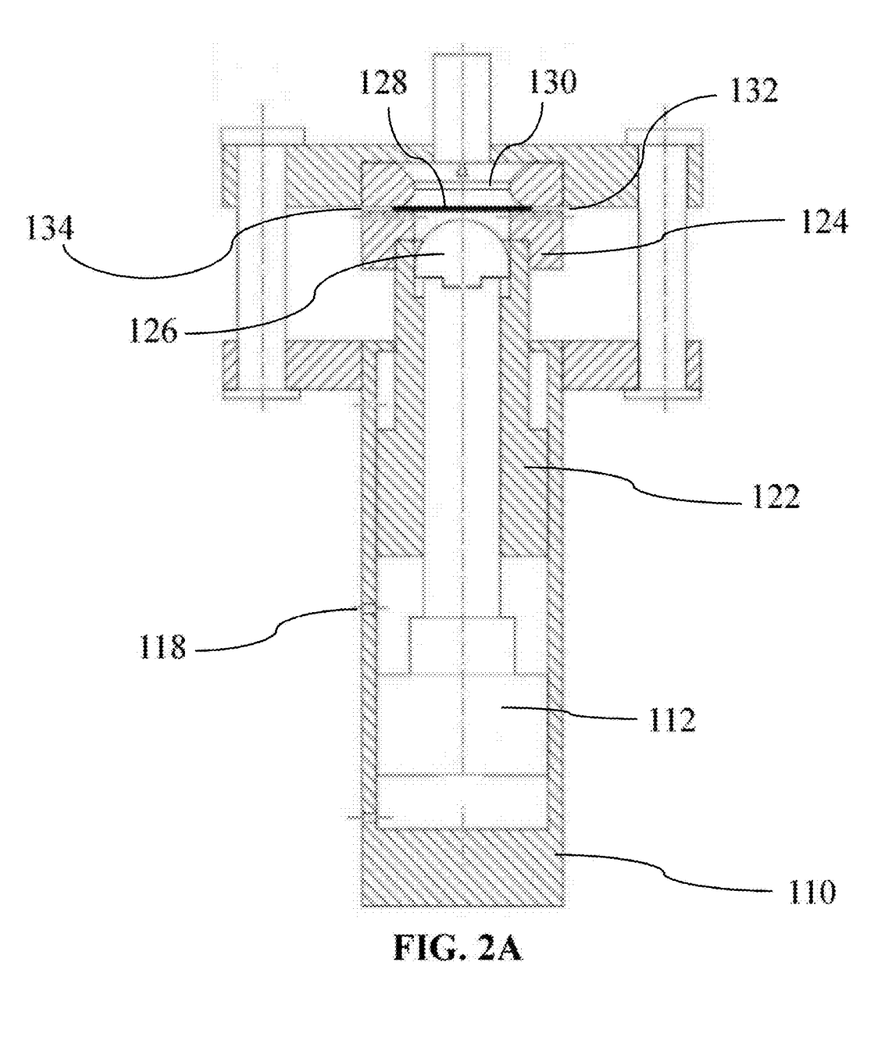
FIGS. 2A-2C illustrate an implementation of different steps of a testing process of the universal testing of metal sheet formability system.
Figure 2B:
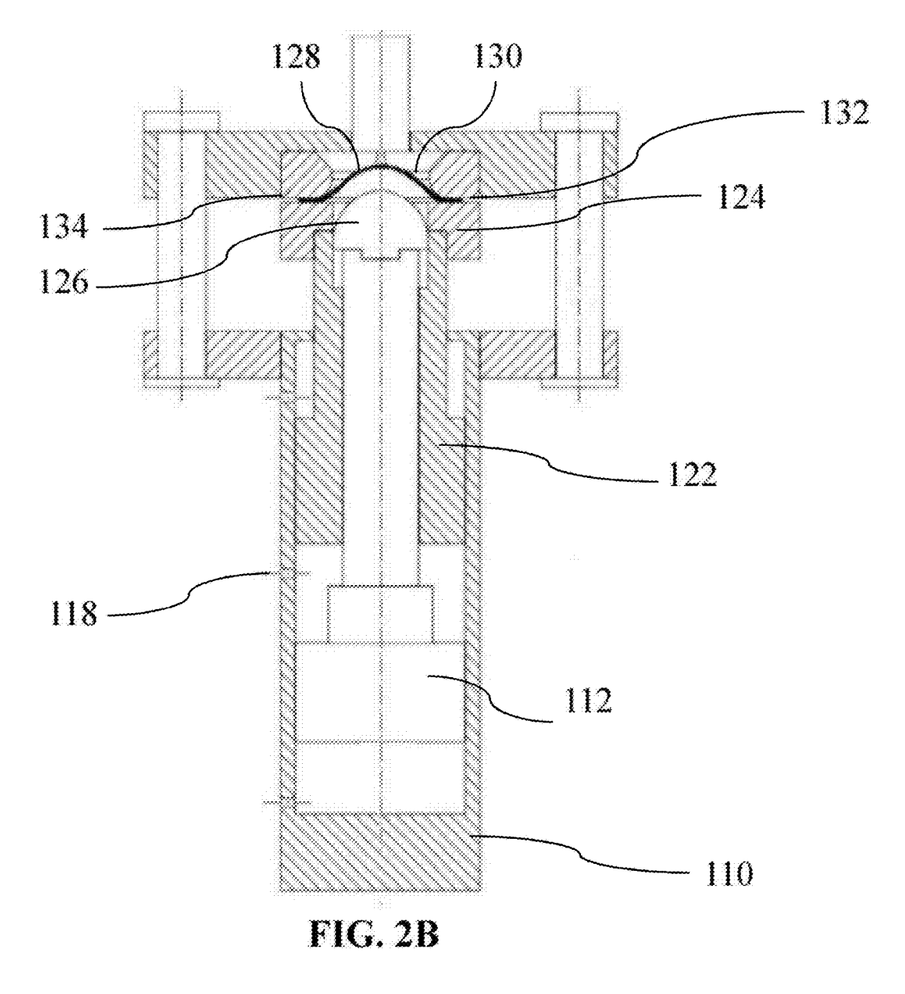
Figure 2C:
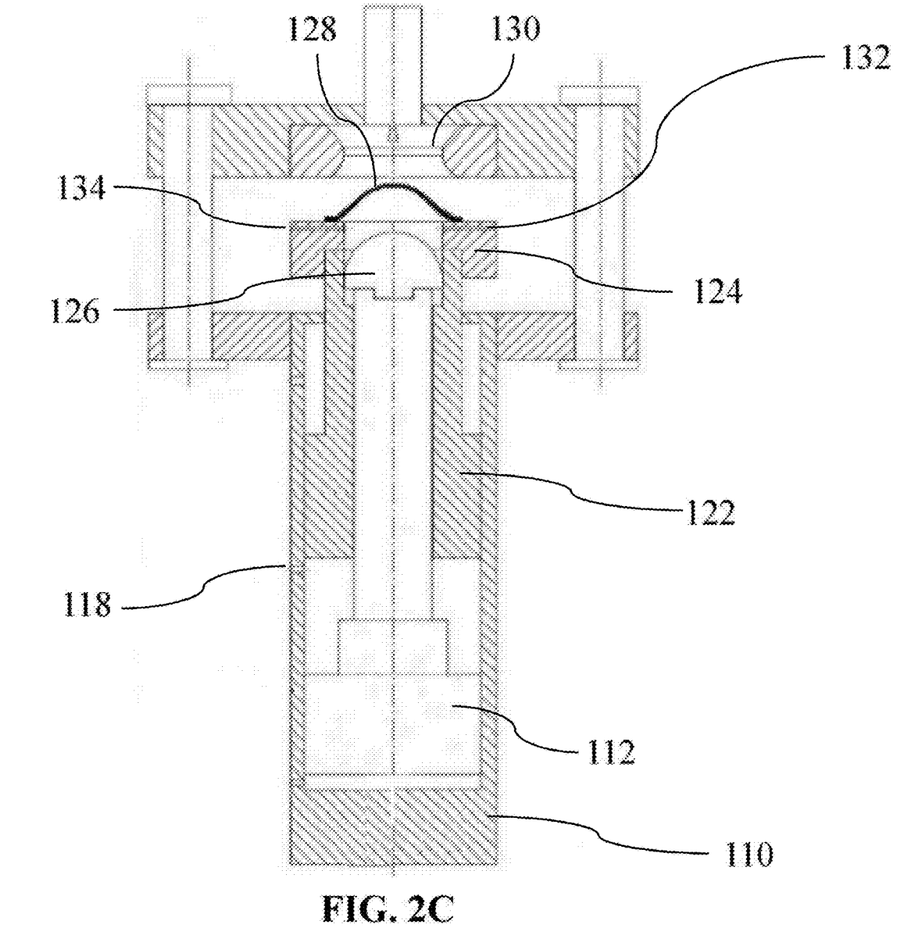

FIG. 1A shows the universal testing of metal sheet formability system 100 in an initial or rest state. Referring now to FIGS. 2A-2C, an implementation of the testing process (representing an active state) can be understood to occur generally in three steps. As shown in FIG. 2A, in a first step, the first directional control valve 116 is shifted to its 'cross-way' position and opens the flow to the port 144 and the fluid enters the cylinder barrel 110 through the lower chamber port 144. In one implementation, the lower chamber port 144 is located along the bottom of the cylinder barrel 110 and fluid can flow into a lower portion of the cylinder barrel. Fluid pressure can translate or move the first piston 112 in an axial direction. The second piston 122 may be located above the first piston 112 and near a middle region of the cylinder barrel 110 in one implementation. When the third directional control valve 150 is not activated, and no force is applied on the blankholder 124, the axial motion of the first piston 112 can also causes the second piston 122 to translate or move in an axial direction.

In addition, in some implementations, a port associated with the middle region of the cylinder barrel 110 can be connected to the safety valve via the middle chamber port 118. The safety valve can be configured to allow fluid to flow into the cylinder barrel 110 until the pre-determined value of the fluid pressure is reached, after which the fluid can be configured to flow out of the cylinder barrel 110 via the middle chamber port 118. In some implementations, the second piston 122 may be configured to move upward until the blank 128 is secured or attached and sealed to either or both the blankholder 124 and the die 130.

FIG. 2B illustrates a second step of the testing process. In this step, the second piston 122 is fixed or disposed in the highest position. If the bulge test is being performed, the directional control valve 136 is shifted to its 'straight way' direction or position and the check valve 140 allows the fluid to move into the space between the punch 126 and the blank 128 and further permits the air to exit from this space throw the pilot-operated check valve 138. The fluid flows through the bulge chamber inlet 132. In addition, air exits the system via the bulge chamber outlet 134 until the space between the punch 126 and the blank 128 is filled with the fluid. At this time, the directional control valve 136 is shifted to the 'cross-way' which results in the check valve 140 and the pilot-operated check valve 138 closing, thereby preventing inlet and outlet flow of the fluid from the space extending between the blank 128 and the punch 126. The directional control valve 116 is again shifted to its 'cross-way' position, allowing the flow of fluid inside the cylinder barrel 110 through the lower chamber port 144, which moves both the first piston 112 and the punch 126 axially. Moving the punch 126 pressurizes the fluid within the space between the punch 126 and the blank 128. This pressure is used as a driving force for bulge testing of any metal sheets. The pressure associated with the fluid between the punch 126 and the blank 128 may be measured by a pressure sensor (not shown) in some implementations.

Moreover, in implementations configured for measurement of strain during bulge testing, the grids may be applied initially to the blank 128. The grids can facilitate the measurement and calculation of strain of the blank 128 during the bulge testing process from the displacement data points gathered via a grid displacement measurement device (which can take the position of sensor 146). In one implementation, a grid displacement measurement device can comprise photographic images produced by a high-resolution camera. The high-resolution camera may use high-resolution photographic films or high-resolution photographs which are digitized before image analysis is performed. The images can contain information about the deformation, or displacement of points on the blank 128 as a function of time. In one implementation, a processor may be used to perform image analysis. Furthermore, a computer-implemented software may be used to correlate the data points captured during the testing processes and calculate the formability of the metal sheet.

A third step is represented by FIG. 2C, where it can be seen that the blank 128 is detached from the punch 126. For this step, the directional control valve 116 is shifted to its 'straight way' position and the directional control valve 150 is shifted to its 'straight way' position and allow the fluid to flow into the middle chamber of the cylinder barrel 110 through the middle chamber port 118. The fluid flow can cause the first piston 112 to move downward and detach the blank 128 from the punch. When the piston 112 reaches its lower position, the directional control valve 150 is shifted to its 'cross-way' position, allowing the fluid in the middle chamber to flow out of the chamber and the fluid flowing into the upper chamber of the cylinder barrel 110 through the upper chamber port 148 detaches the blank 128 from the die 130.

Thus, as a general overview, the method can include positioning the blank above the blankholder, activating a first piston in the cylinder barrel, such that the first piston and second piston moves in an axial direction until the blank is secured between the blankholder and the die, filling the bulge chamber with the fluid and removing air from a space between the punch and the blank by substantially filling the space between the punch and the blank with the fluid, moving the punch gradually in an axial direction toward the blank, the movement being caused by fluid pressure on the lower face of first piston and causes the pressure of the fluid in the bulge chamber to increase and form the blank, recording the blank displacement by a displacement measurement device and recording the pressure of the fluid in the bulge chamber, separating the blank from both the die and the punch by moving both the first piston and the second piston downward using the fluid power or springs or both.

In other implementations of this method, the displacement measurement device is a high-resolution camera or a displacement measurement sensor. In some implementations, the system is used to produce a Forming Limit Curve, Blanking testing, Nakazima testing, Marciniak testing, Bulge testing, Cupping testing, and/or hydroforming metal sheets.

Figure 3A:
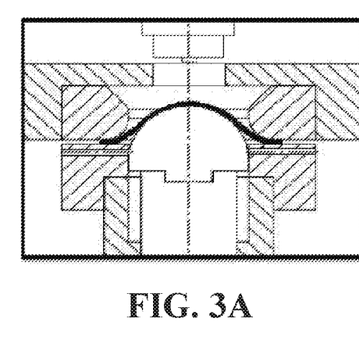
FIGS. 3A-3G illustrate a variety of implementations of the formability system.
Figure 3B:
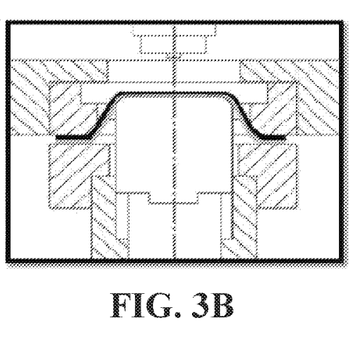

Referring now to FIGS. 3A-3G, a series of cross-sectional views help illustrate other implementations of the present application. FIGS. 3A & 3B illustrate an aspect of the formability system 100 for testing Nakazima modeling (FIG. 3A) and Marciniak modeling (FIG. 3B). Marciniak testing has been used to study the role of material defects under balanced biaxial stretching conditions. Nakazima tests use a punch to deform sheet metal under many strain paths, including biaxial tension. An advantage of the Nakazima test is its ability to undergo various strain paths, from minimal stress to larger stresses such as necking and fracture. In the above mentioned tests, the bulge chamber is not filled with the fluid and the punch itself comes in contact with the blank.

Figure 4:
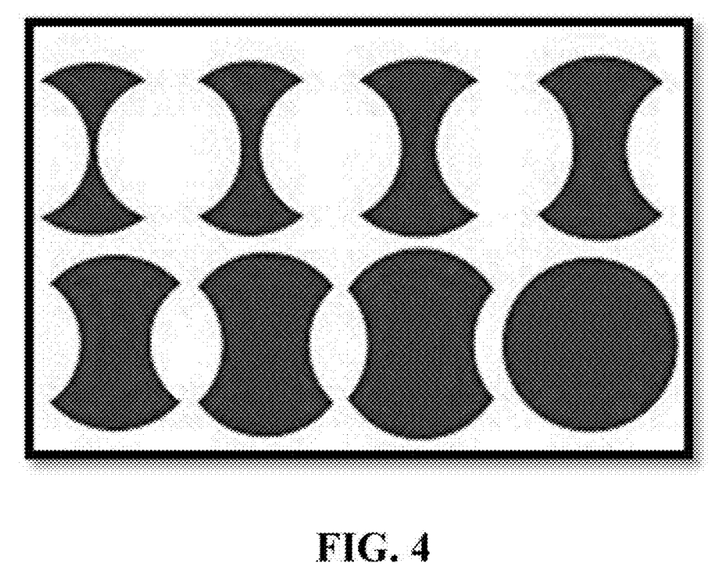
FIG. 4 depicts an example of a series of results for several samples.

FIG. 4 illustrates the results for some samples of the Nakazima testing in accordance with one implementation of the present application. In these implementations, after the first step, the space between the punch and the blank may not be filled with the fluid. Instead, the punch can move axially to attach or be secured to the blank and push the blank to the die. A high-resolution camera gathers images for miniaturized biaxial testing of sheet metal, as discussed above. The resulting strain paths may be used to determine the Forming Limit Curve (FLC) of the metal sheets.

Figure 3C:
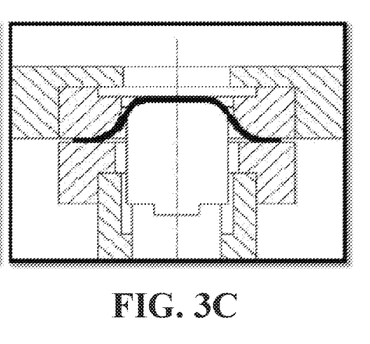
Figure 3D:
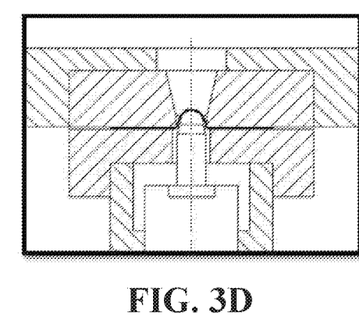
Figure 3E:
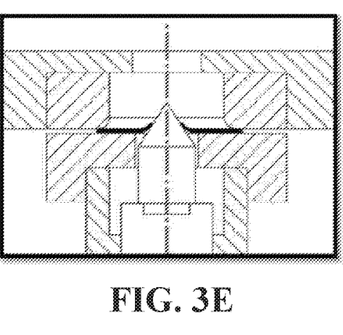

Referring to FIG. 3C, in another implementation, the formability system may be used for a deep-drawing test. Deep drawing refers to a sheet metal forming process in which a sheet metal blank is radially drawn into a forming die by the mechanical action of a punch. It is thus a shape transformation process with material retention. The process is considered "deep" drawing when the depth of the drawn part exceeds its diameter. As shown in FIG. 3C, for deep drawing test the blankholder, the punch and the die may be substituted with deep drawing dies. The safety valve 120 controls the blankholder-force for deep drawing test. The other steps are similar to those of Nakazima testing as abovementioned.

Figure 3F:
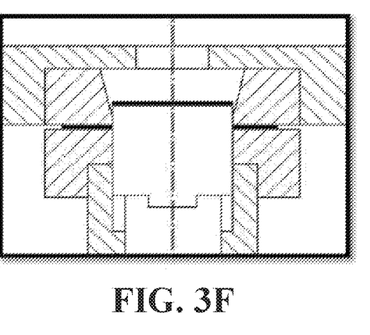
Figure 3G:
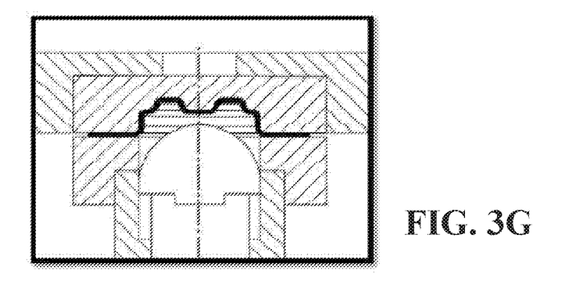

Thus, by further substitutions of the blankholder, and the punch and the die with proper dies, in different implementations, the formability system may be used for a cupping test (FIG. 3D), a hole expansion test (FIG. 3E) and a Blanking test (FIG. 3F). In these tests, the bulge chamber is not filled with the fluid and the punch itself comes in contact with the blank. In addition, in one implementation, the system may also be used as an apparatus for hydroforming of metal sheets (FIG. 3G).

Figure 5A:
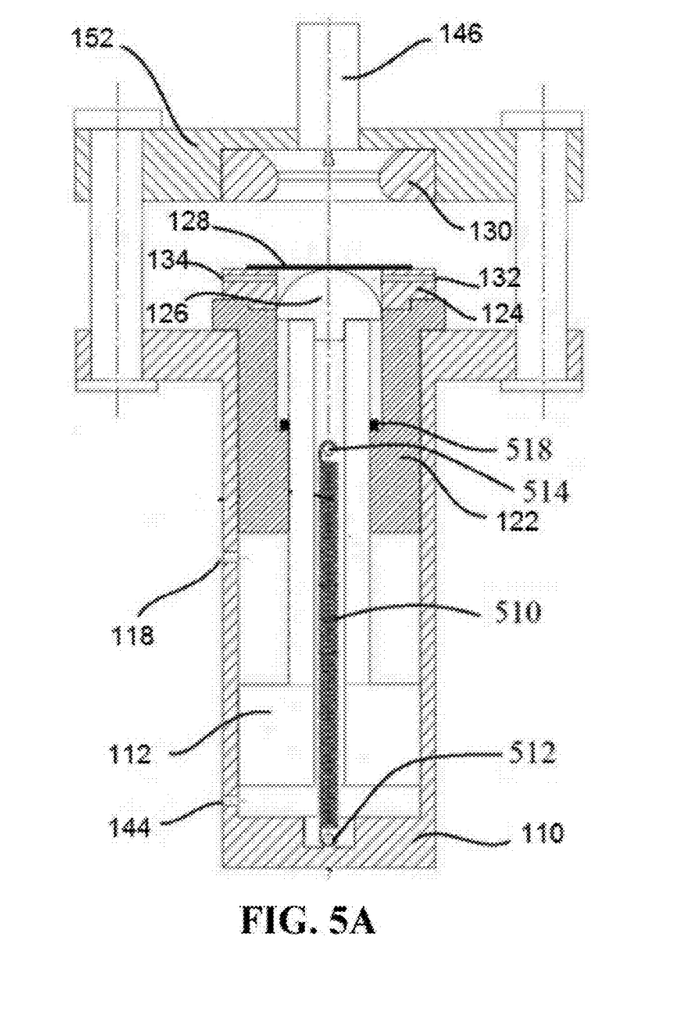
FIGS. 5A and 5B illustrate an implementation of a spring-facilitated universal testing of metal sheet formability system.
Figure 5B:
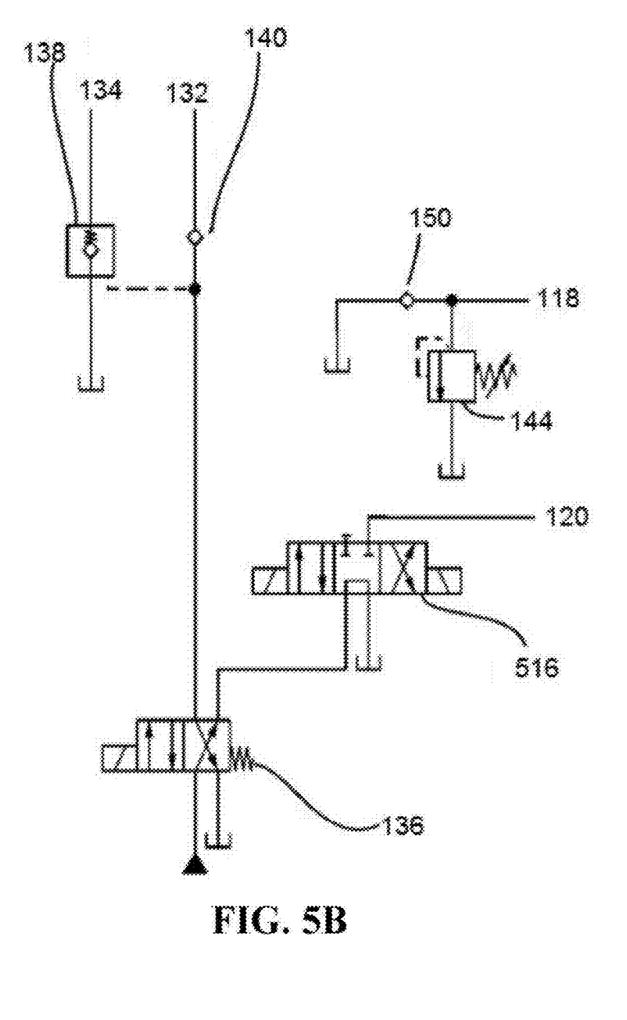

FIGS. 5A and 5B illustrates another implementation of a formability system. A second system 500 may be spring-facilitated. As shown in FIGS. 5A and 5B, second system 500 can include a spring 510, a first pin 512, a second pin 514, and a pin or a snap ring 518. The spring 510 may be connected at a first end to the bottom of the cylinder barrel using a first pin 512 and at a second end to a central portion of the rod of the first piston using a second pin 514. The snap ring 518 may be located along the central portion of the rod of the first piston. This system is substantially similar to that described with reference to FIG. 1. However after the testing operation is complete, the directional control valve 516 is shifted to the 'straight way' position, removing the pressure from the lower portion of the cylinder barrel. The spring 510 then moves the second pin 514 and then the first piston in a downward direction. Subsequently, when the snap ring 516 touches the second piston, it moves the second piston downward to detach the blank from the die.

Figure 6A:
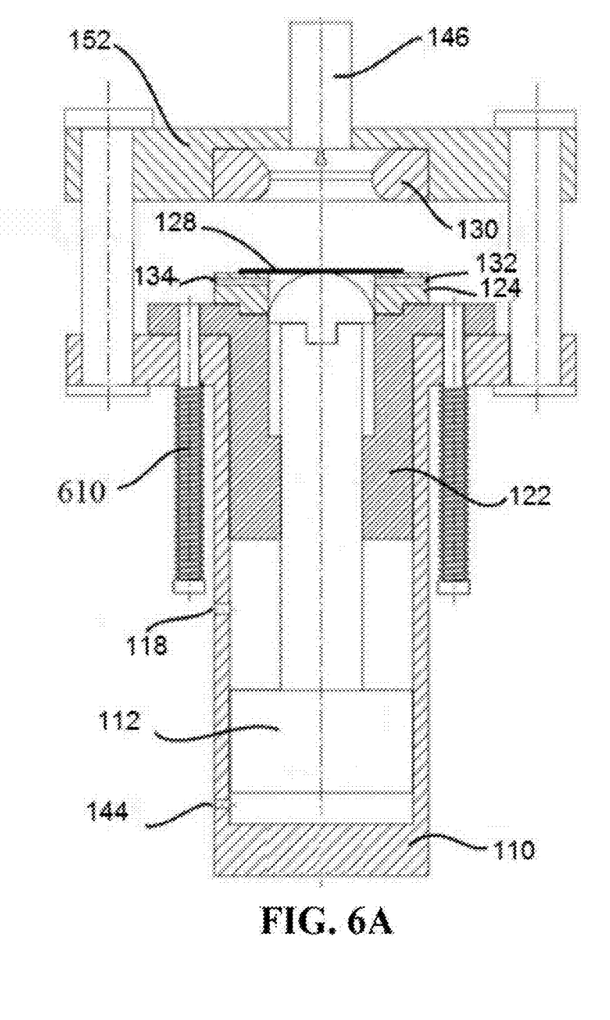
FIGS. 6A and 6B illustrate an implementation of a two-spring-facilitated universal testing of metal sheet formability system.
Figure 6B:
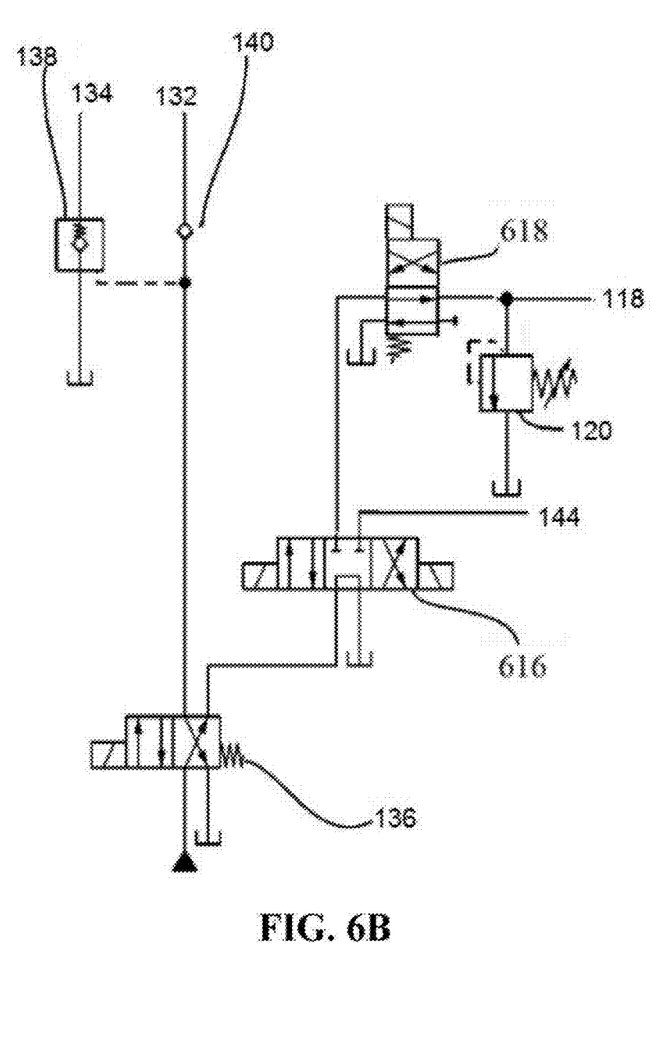

Referring now to FIGS. 6A and 6B, another implementation of a spring-facilitated system is depicted, including a spring-facilitated universal testing of metal sheet formability system ("third system") 600. Third system 600 may include two or more springs 610 which may be located outside of the cylinder barrel, connected at a first end to a base and at a second end to the second piston. Third system 600 works in a substantially similar manner as that described with reference to FIG. 1. However, after the testing operation is complete, the directional control valve 616 is shifted to the 'straight way' position and the fluid enters the middle chamber portion of the cylinder barrel and returns the first piston to the lower position. Then the directional control valve 616 is shifted to the 'cross-way' position, removing the pressure from the lower surface of the second piston. The springs 610 then move the blankholder downward to detach the blank from the die after testing is complete.

Figure 7:
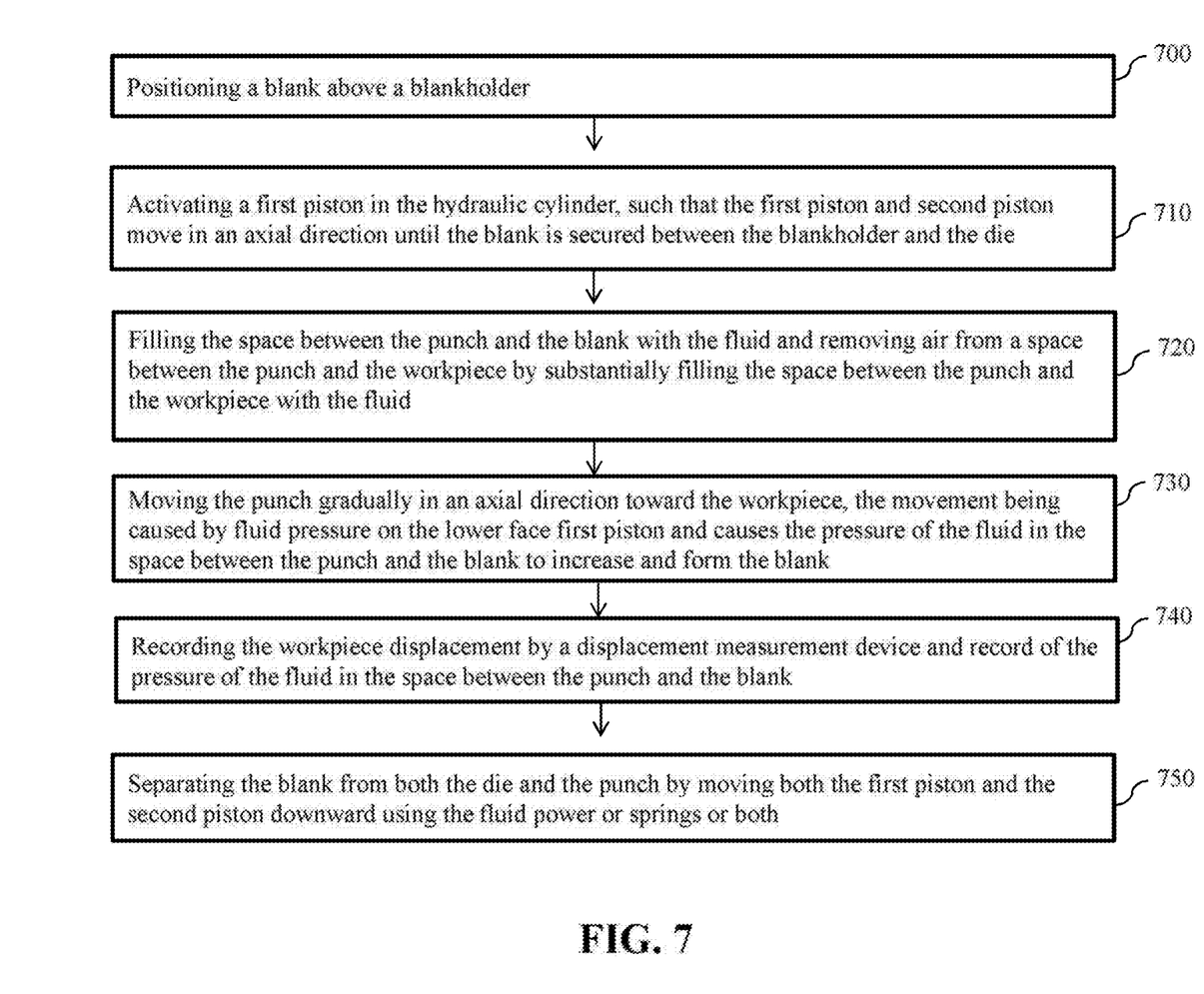
FIG. 7 illustrates an exemplary flow chart for testing of metal sheet formability using a formability system.

For purposes of clarity, a flow chart is provided in FIG. 7. In some implementations, a method of testing of metal sheet formability using a formability system can comprise seven general steps. A first step 700 includes positioning the blank above the blankholder. A second step 710 includes activating a first piston in the hydraulic cylinder, such that the first piston and second piston move in an axial direction until the blank is secured between the blankholder and the die. A third step 720 may include filling the space between the punch and the blank ("bulge chamber") with the fluid and removing air from a space between the punch and the blank by substantially filling the space between the punch and the blank with the fluid. In a fourth step 730, the punch is gradually moved in an axial direction toward the blank, the movement being caused by fluid pressure on the lower face of first piston and causes the pressure of the fluid in the bulge chamber to increase and form the blank. A fifth step 740 can include recording the blank displacement by a displacement measurement device and recording of the pressure of the fluid in the space between the punch and the blank ("bulge chamber"). A sixth step 750 involves separating the blank from both the die and the punch by moving both the first piston and the second piston downward using the fluid power or springs or both.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. An apparatus for testing metal sheets formability, the apparatus comprising:
   a cylinder barrel;
   a first piston disposed in a lower portion of the cylinder barrel;
   a lower chamber port disposed along a bottom portion of the cylinder barrel, below the first piston;
   a middle chamber port formed in a central portion of the cylinder barrel, above the first piston;
   a second piston located within the cylinder barrel, above the first piston;
   an upper chamber port disposed along an upper portion of the cylinder barrel, above the second piston;
   a blankholder disposed above the second piston, the blankholder configured to hold a blank;
   a punch connected to a rod of the first piston and configured to press the blank against a die, the die being disposed above the blank;
   a bulge chamber, the bulge chamber including a space extending between the punch and the blank;
   a bulge chamber inlet disposed below the blank on a first side of the blankholder; and
   a bulge chamber outlet disposed below the blank on a second side of the blankholder.

2. The apparatus of claim 1, further comprising:
   a first directional control valve configured to control fluid inflow and outflow in the cylinder barrel;
   a first safety valve configured to control fluid inflow and outflow in a middle chamber of the cylinder barrel;
   a second directional control valve configured to control fluid flow to the cylinder barrel or to the bulge chamber;
   a first check valve, the first check valve being configured to at least partially control fluid flow inside the bulge chamber;
   a pilot operated check valve, the pilot operated check valve being configured to at least partially control the fluid flow outside the bulge chamber;
   a pressure sensor connected to the bulge chamber, the pressure sensor being configured to measure fluid pressure inside the space extending between the blank and the blankholder; and
   a displacement measurement device disposed on top of the blank configured to record the displacement of the blank during a forming process.

3. The apparatus of claim 2, further comprising a third valve being configured to at least partially control fluid inside a central chamber and upper chamber of the cylinder barrel.

4. The apparatus of claim 2, wherein the displacement measurement device is a high-resolution camera or a displacement measurement sensor.

5. The apparatus of claim 1, further comprising:
   a first spring, wherein a first end of the first spring is connected to the bottom portion of the cylinder barrel via a first pin, and a second end of the first spring is connected to the first piston;
   the first spring being configured to move the first pin and the first piston in a downward direction when the at least one directional control valve transitions from a closed state to an open state; and
   a snap ring, the snap ring being configured to contact a second piston and move the second piston downward in order to detach the blank from the die.

6. The apparatus of claim 1, wherein the apparatus is used for hydroforming metal sheets or Blanking testing.

7. The apparatus of claim 1, wherein the apparatus is used for Nakazima testing, Marciniak testing, Bulge testing, or Cupping testing.

8. The apparatus of claim 1, wherein the piston is configured to move axially in the cylinder barrel in a direction towards the die.

9. The apparatus of claim 1, wherein fluid input and fluid output is controlled manually.

10. The apparatus of claim 1, wherein the fluid comprises water or an oil.

11. The apparatus of claim 1, further comprising a heating device.

* * * * *